United States Patent

Numata et al.

[15] 3,687,363

[45] Aug. 29, 1972

[54] DIGITAL-ANALOGUE CONVERTER

[72] Inventors: Hideo Numata, Kawasaki; Kazuyuki Nakahara, Tokyo, both of Japan

[73] Assignee: Oval Engineering Co., Ltd., Tokyo, Japan

[22] Filed: Dec. 16, 1970

[21] Appl. No.: 98,556

[30] Foreign Application Priority Data

Dec. 18, 1969 Japan....................44/101545
Sept. 26, 1970 Japan....................45/83895

[52] U.S. Cl.....................235/200, 340/347 DA
[51] Int. Cl.....................H03k 13/02
[58] Field of Search..........235/200, 201; 340/347; 137/624.11

[56] References Cited

UNITED STATES PATENTS 3,458,129 7/1969 Woodson..............235/200 PF
3,288,365 11/1966 Shiiki..................235/201 ME
3,346,725 10/1967 Allured..................235/92 RB

*Primary Examiner*—Maynard R. Wilbur
*Assistant Examiner*—Robert F. Gnuse
*Attorney*—William D. Hall, Elliott I. Pollock, Fred C. Philpitt, George Vande Sande, Charles F. Steininger and Robert R. Priddy

[57] ABSTRACT

A digital-analogue converter comprising fluid operated elements in which a pneumatic input pulse signal is connected to a pneumatic pulse shaping circuit to limit the width and the peak value of the pulse to predetermined values and in which a means value of air pressure can be obtained through an integrating circuit.

9 Claims, 6 Drawing Figures

Patented Aug. 29, 1972 3,687,363

3 Sheets-Sheet 1

INVENTORS
Hideo Numata
Kazukuki Nakahara

BY Ernest D. Pollock
ATTORNEY

INVENTORS
Hideo Numata
Kazuyuki Nakahara

BY

ATTORNEY

INVENTORS
Hideo Numata
Kazuyuki Nakahara

BY

ATTORNEY

DIGITAL-ANALOGUE CONVERTER

BACKGROUND OF THE INVENTION

Conventional means for converting a digital signal to an analogue value generally takes a form of an electrical device which primarily comprises in combination relay means, capacitors, resistors, transistors and other electronic parts. Such a known device is disadvantageous in its operation in that it is often subjected to problems of generation of heat and spark, wear of relay contacts, failure of contacts and deterioration of electronic parts, and that the transistors are usually affected by radiations or magnetic field and cannot be used under an elevated temperature. Thus, the known device has been limited in its life and can be used only under a limited condition.

SUMMARY OF THE INVENTION

An object of the present invention is to provide a digital-analogue converter in which a digital signal in the form of a pneumatic input pulse signal is converted to an analogue value by means of a fluid circuit including pure fluidic elements which is sensitive to a pulsating rate of the input signal.

Another object of the present invention is to provide a digital-analogue converter which converts a digital signal in the form of a pneumatic pulse signal generated in an instrument such as a flow meter or the like to an analogue value such as a mean pressure and transmits the analogue value to a conventional analogue instrument such as a pressure gauge, a pneumatic recorder or another control process.

A further object of the present invention is to provide a digital-analogue converter which is simple in construction, less sensitive to variations in temperature condition and the like, and has an improved durability since it has no parts which may be subjected to mechanical wear.

A further object of the present invention is to provide a fluidic digital-analogue converter which can effectively be used in an inflammable circumstance.

These and further objects and the advantages of the present invention will become clear from the following descriptions which will be made taking reference to the accompanying drawings.

DESCRIPTION OF THE PREFERRED EMBODIMENTS

Figure 1:
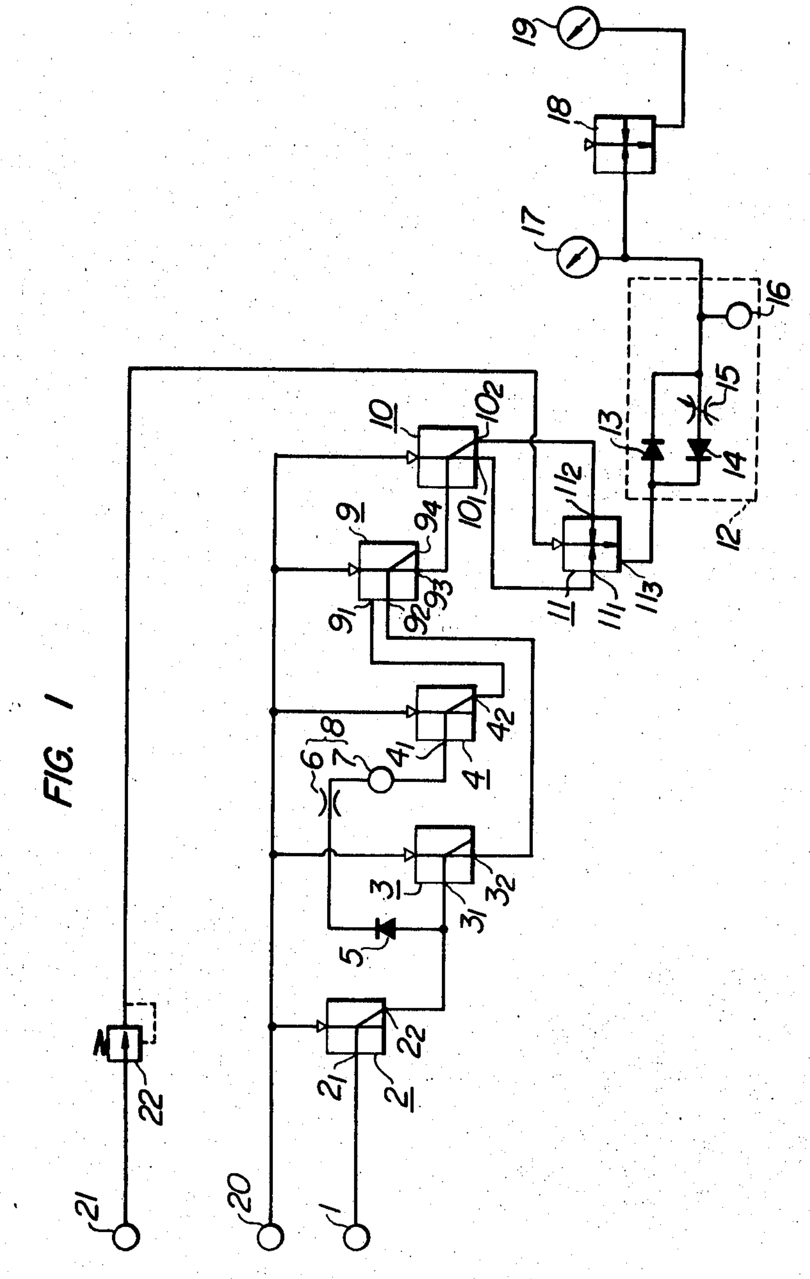
FIG. 1 is a block diagram showing an embodiment of the digital-analogue converter in accordance with the present invention.

Referring to FIG. 1, the reference numeral 1 shows an input part for a pneumatic pulse signal to which a pneumatic pulse signal is supplied at a certain pulse rate. The reference 2 shows a first pulse shaping OR element, 3 a first NOR element connected to the output side of said first OR element 2, 4 a second OR element connected to the output side of said first OR element 2 through a first diode 5 and a time delay circuit 8 including a first flow restriction 6 and a first volume chamber 7, 9 a second NOR element having two input parts $9_1$ and $9_2$ respectively connected to the output part of the second OR element 4 and that of the first NOR element 3, and 10 a OR-NOR element connected to the output side of the second NOR element 9. The OR-NOR element 10 has output parts $10_1$ and $10_2$ which are respectively connected to the input parts $11_1$ and $11_2$ of a deflection type amplifying element 11 which is an analogue proportional amplifier comprising a pure fluidic amplifying element. The amplifying element 11 has an output $11_3$ at which the element 11 generates a shaped pulse having a constant peak value and a constant width. The reference numeral 12 shows an integrating circuit including diodes 13 and 14, a variable flow restriction 15 and a second volume chamber 16. The second volume chamber 16 is connected to a pressure indicator 17. Thus, the output signal from the element 11 is integrated by the circuit 12 and, through the action of the second volume chamber 16, indicated on the pressure indicator 17 as a mean pressure or an analogue value. The reference numeral 18 shows another deflection type amplifying element having a pressure indicator 19, which may be used when it is desired to amplify the pressure indication. The reference numeral 20 shows a source of compressed air supplied to each of the elements, 21 a separate source of compressed air supplied to the deflection type amplifying element 11, and 22 a pressure regulator provided in the passage from the air source 21 to the element 11.

Operation of the above arrangement will now be described.

When a pneumatic pulse signal is supplied from a counting mechanism or other pneumatic pulse generating mechanism to the input part 1 of the apparatus, a signal [1] is applied to the input part $2_1$ of the first OR element 2, so that the signal [1] appears at the output part $2_2$ of the element 2 with a shaped configuration.

Since a portion of the output signal [1] is on one hand directly supplied to the input part $3_1$ of the first NOR element 3, a signal [0] appears at the output part $3_2$ of the element 3. The output signal of the element 3 is then transmitted to the input $9_2$ of the second NOR element 9. The remaining portion of the output from the element 2 is on the other hand supplied through the diode 5 and the delay circuit 8 including the flow restriction 6 and the volume chamber 7 to the second OR element 4 to generate a pneumatic pulse signal corresponding to [1] which is then transmitted with a certain time delay to the input part $9_1$ of the second NOR element 9.

When a [0] signal is supplied to the input part $9_2$ of the second NOR element 9, a [1] penumatic pulse signal is generated at the NOR side output part $9_3$.

When the [1] signal is supplied through the delay circuit 8 to the input part $9_1$ of the element 9, the output of the element 9 is switched to OR side output part $9_4$ and thus the output signal at the NOR side becomes [0].

Therefore, the output signal from the second NOR element 9 takes a form of a pneumatic pulse signal having a width corresponding to the delay time $t$ of the delay circuit 8 irrespective of the value of pulsating rate.

The pneumatic pulse signal at the output part $9_3$ of the second NOR element 9 is transmitted to the OR-NOR element 10, the outputs of which are then transmitted from the output parts $10_1$ and $10_2$ thereof to the input parts $11_1$ and $11_2$, respectively, of the deflection type amplifying element 11. Thus, a pneumatic pulse of a limited peak value can be obtained at the output part $11_3$ of the amplifying element 11.

Figures 2A, 2B, 2C:
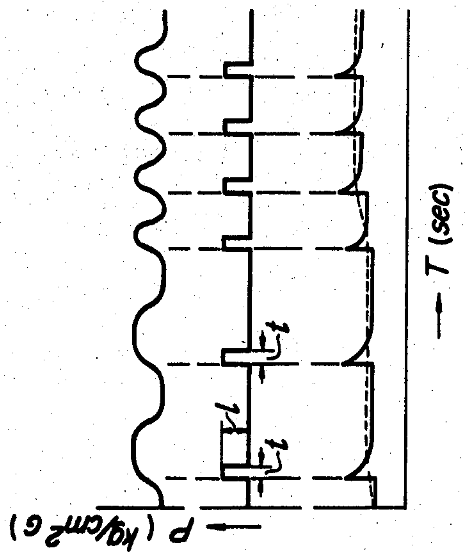
FIG. 2 is a diagram which shows the timed relations between signal waves in different portions of the apparatus shown in FIG. 1 and in which the line *a* represents an input pulse signal, *b* a pulse signal at the output part of a deflection type amplifying element and *c* an integrated wave form and a mean pressure thereof at an integrating circuit.

Thus, when the pneumatic pulse input part 1 is supplied with a pulse signal as shown by $a$ in FIG. 2, the output signal at the output part $11_3$ of the amplifying element 11 will be a shaped pneumatic pulse which has, as shown by $b$ in FIG. 2, a constant width $t$ and a constant peak value $l$.

The pneumatic pulse signal having a constant pulse width and a constant pulse peak value is passed through the diode 13 into the volume chamber 16 to be temporarily stored therein, the stored pressure being discharged through the variable flow restriction 15 and the diode 14 when the signal at the output part $11_3$ of the amplifying element 11 becomes [0] to thereby reduce the pressure so as to generate an integrated output as shown by $c$ in FIG. 2. The output is then indicated by the pressure indicator 17 as shown by a dotted line in FIG 2$c$ as an analogue value or mean pressure.

The mean pressure may then be indicated in the pressure indicator 19, when desired, through the second deflection type amplifying element 18 which amplifies the mean pressure.

Figure 3:
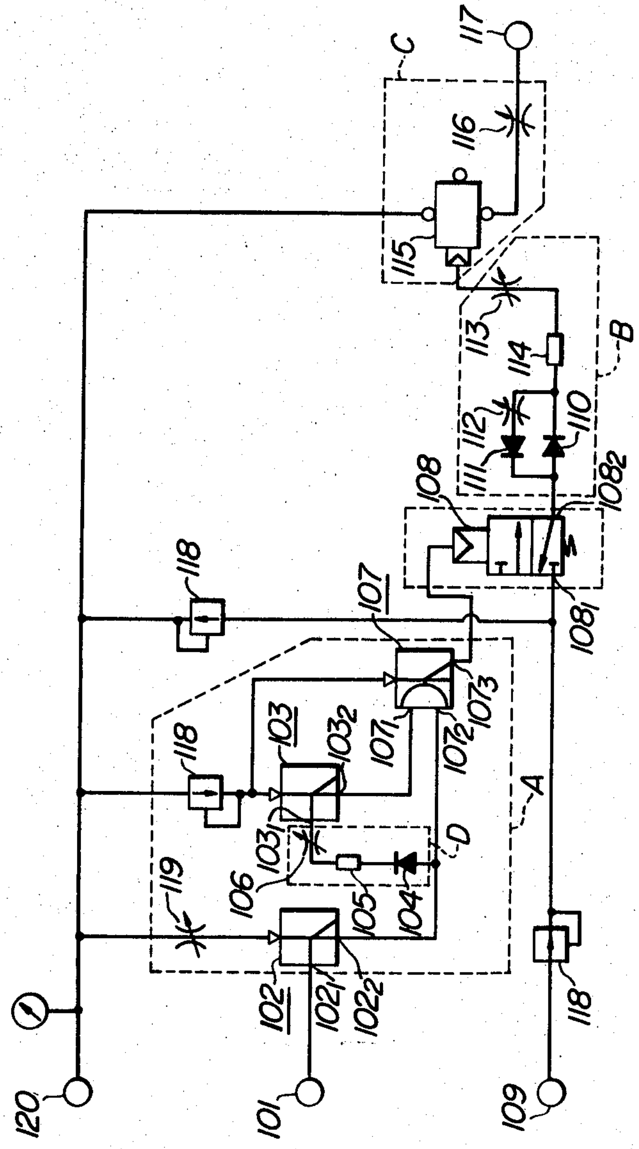
FIG. 3 is a block diagram showing another embodiment of the digital-analogue converter in accordance with the present invention.

Referring to FIG. 3 which shows another embodiment of the present invention, the reference numeral 101 shows an input part where a pneumatic pulse proportional to a rotational speed is supplied, 102 a first pulse shaping NOR element, 103 a second NOR element having an input part $103_1$ connected through a diode 104 and a time delay circuit D comprising a volume chamber 105 and a flow restriction 106 to the output part $102_2$ of the first NOR element 102. The reference numeral 107 shows an AND gate having input parts $107_1$ and $107_2$ for receiving input signals from said NOR elements 102 and 103, respectively. The AND gate 107 also has an output part $107_3$ which is connected to a pneumatic pressure amplifying element 108. The elements 102, 103 and 107 constitute a shaping circuit A for the element 108. The amplifying element 108 may be constituted by a pure fluidic logical element such as a flip-flop element and serves as a switching valve having a predetermined peak value. A supply source 109 of compressed air of a predetermined pressure is connected to an input part $108_1$ of the element 108, and the output part $108_2$ of the element 108 is connected to an integrating circuit B including diodes 110 and 111, variable flow restrictions 112 and 113 and a volume chamber 114. The reference numeral 115 shows a biasing element connected to the integrating circuit B and forming a biasing circuit C together with a flow restriction 116, whereby an analogue output is generated at the output part 117 of the circuit C.

In the drawing, the reference numeral 118 shows a pressure regulator, 119 a variable flow restriction, and 120 an air supply for an air pulsator.

Figure 4:
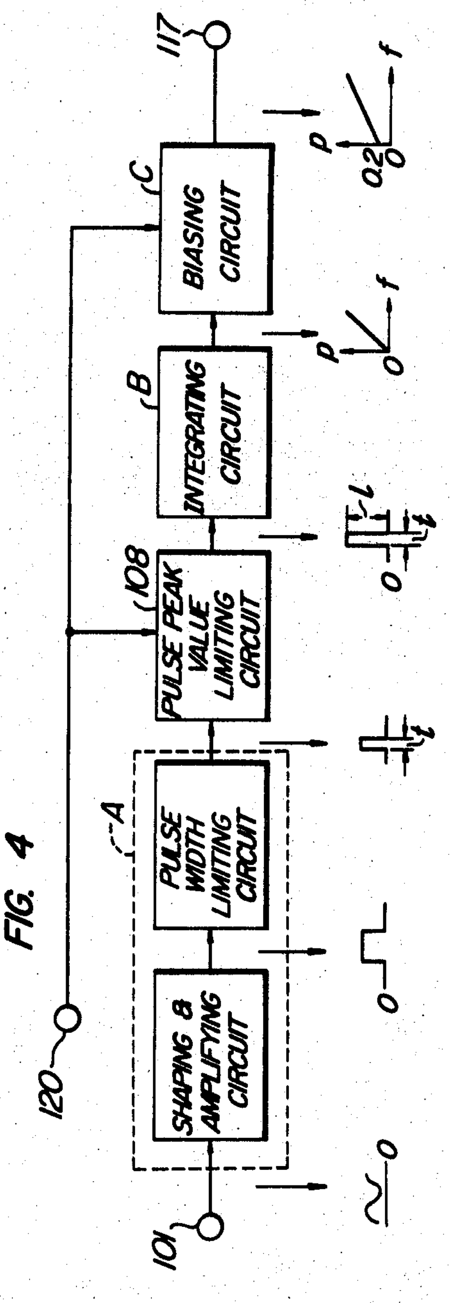
FIG. 4 shows the principle of the apparatus shown in FIG. 3.

The arrangement of FIG. 3 can be represented by the diagram of FIG. 4 and the operation of this arrangement will now be described taking reference to FIG. 4 as well as FIG. 3.

A pneumatic pulse signal is supplied from a counting mechanism or other pneumatic pulse generating mechanism to the input part 101. When a signal [1] is applied to the input part $102_1$ of the first NOR element 102, a signal [0] is generated at the output part thereof.

Then, the input part $107_2$ of the AND gate 107 is immediately supplied with the signal [0]. On the other hand, the signal [0] is also supplied through the diode 104 and the delay circuit D including the volume chamber 105 and the variable restriction 106 to the second NOR element 103. Thus, a signal [1] appears at the output part $103_2$ of the second NOR element 103 and is passed to the input part $107_1$ of the AND gate 107.

Thus, the input parts $107_1$ and $107_2$ of the AND gate 107 are supplied with [1] and [0] signals, respectively, so that no output signal appears at the output part $107_3$ of the AND gate 107.

When the signal from the input part 101 becomes [0], then a signal [1] appears at the output part $102_2$ of the first NOR element 102. Thus, the input part $107_2$ of the AND gate 107 is immediately supplied with the signal [1] while the input part $107_1$ is still supplied with the signal [1], so that the gate is opened to generate an output signal at the output part $107_3$ of the AND gate 107.

A portion of the signal generated at the first NOR element 102 is supplied through the diode 104 and the delay circuit D including the volume chamber 105 and the variable flow restriction 106 to the second NOR element 103 with a predetermined time delay $t$. Thus, after the time delay $t$, the signal [1] at the output part $103_2$ of the element 103 disappears, so that the signal supplied to the input part $107_1$ of the AND gate 107 is changed from [1] to [0].

Therefore, different signals are applied to the input parts $107_1$ and $107_2$ of the AND gate 107 to close the gate and terminate the output from the output part $107_3$.

In the manner described above, the AND gate 107 generates at its output part $107_3$ a single pulse or a differential pulse having a pulse width corresponding to the delay time $t$ determined by the time delay circuit D. Further, the width of the pulse is limited to a predetermined value irrespective of the pulse rate and, as shown in FIG. 4, an initial irregular and indistinct pneumatic pulse is converted to a pulse signal having a width $t$.

Thus, the pulse signal having a predetermined pulse width is passed to the pneumatic pressure amplifying element 108 such as a flip-flop circuit to open the constant pressure air supply from the source 109 in accordance with the number of the pulse supply. By this means, a pulse signal of a predetermined peak value $l$ can be obtained at the output part $108_2$ of the element 108 as shown in FIG. 4.

Then, the pulse signal of a predetermined peak value $l$ is supplied through the diode 110 to the volume chamber 114 of the integrating circuit B to be temporarily stored therein and discharged through the variable flow restriction 112 and the diode 111 to the output side of the element 108. Thus, an integrated wave form can be obtained as shown in FIG. 4.

The integrated wave is then passed through the biasing circuit C and discharged as an analogue output having a pressure of for example 0.2 to 1.0 kg/cm².

In this embodiment, even when the pneumatic pulse signal is stopped in such a condition where a signal [1] is continuously held at the input part 101, the output signal at the output part $102_2$ of the first NOR element 102 remains [0] while a signal [1] is generated at the output part of the second NOR element 103, so that [1] and [0] signals are respectively supplied to the input parts $\mathbf{107_1}$ and $\mathbf{107_2}$ of the AND gate 107. Therefore, no output signal will be generated at the AND gate. Similarly, when the pulse signal at the input part 101 remains [0], the AND gate 107 receives the output signal [1] at its input part $\mathbf{107_2}$ from the first NOR element 102 while the input part $\mathbf{107_1}$ which is connected to the NOR side of the second NOR element 103 receives a signal [0], so that no output signal is generated at the AND gate 107. Thus, any operational trouble is not encountered.

Although the present invention has been described with reference to two embodiments, it will be understood that changes or modifications may be made without departing the spirit and scope of the invention as defined by the appended claims.

What is claimed is: integrating

1. A fluidic digital-analogue converter comprising a first pneumatic pulse shaping circuit for shaping an input pneumatic pulse signal to a pneumatic pulse signal having a constant pulse width, a second pneumatic pulse shaping circuit for shaping the output signal of said first shaping circuit to a pneumatic pulse signal of a constant peak value, and a fluid operated integrating circuit for integrating the output signal of said second shaping circuit to obtain a mean pneumatic pressure, said integrating circuit comprising a first diode which allows the output signal of said second shaping circuit to pass therethrough, a volume chamber for receiving the output signal which has passed through said first diode, a bypass parallel with said first diode and including a second diode which allows a reverse flow from the volume chamber to pass therethrough, and a flow restriction connected in series with said second diode.

2. A fluidic digital-analogue converter in accordance with claim 1 in which said second shaping circuit comprises a OR-NOR element controlled by the output signal of said first shaping circuit and a deflection type amplifying element controlled by two output signals of the OR-NOR element.

3. A fluidic digital-analogue converter in accordance with claim 1 in which said second shaping circuit comprises a logical flip-flop element operating as a switching valve having a predetermined peak value, said flip-flop element being controlled by the output signal of said first shaping circuit.

4. A fluidic digital-analogue converter comprising a first pneumatic pulse shaping circuit for shaping an input pneumatic pulse signal to a pneumatic pulse signal having a constant pulse width, a second pneumatic pulse shaping circuit for shaping the output signal of said first shaping circuit to a pneumatic pulse signal of a constant peak value, and a fluid operated integrating circuit for integrating the output signal of said second shaping circuit to obtain a mean pneumatic pressure, said first shaping circuit comprising a first OR element controlled by said input pneumatic pulse, a first NOR element controlled by the output signal of said first OR element, a second OR element controlled by the output signal of said first OR element which is supplied through a time delay circuit, and a second NOR element controlled by the output signal of said first NOR element and the output signal of said second OR element.

5. A digital-analogue converter as claimed in claim 4 wherein said integrating circuit comprises a volume chamber having a flow restriction connected thereto.

6. A fluidic-analogue converter comprising a first pneumatic pulse shaping circuit for shaping an input pneumatic pulse signal to a pneumatic pulse signal having a constant pulse width, a second pulse pneumatic shaping circuit for shaping the output signal of said first shaping circuit to a pneumatic pulse signal of a constant peak value, and a fluid operated shaping circuit for integrating the output signal of said second shaping circuit to obtain a mean pneumatic pressure, said first shpaing circuit comprising a first NOR element controlled by said input pneumatic signal, a second NOR element controlled by the output signal of said first NOR element which is supplied through a time delay circuit, and an AND gate controlled by the output signal of said first NOR element and the output signal of said second NOR element.

7. A fluidic digital-analogue converter as claimed in claim 6 wherein said integrating circuit comprises a volume chamber having a flow restriction connected thereto.

8. A fluidic digital-analogue converter comprising a first pneumatic pulse shaping circuit for shaping an input pneumatic pulse signal to a pneumatic pulse signal having a constant pulse width, a second pneumatic pulse shaping circuit for shaping the constant width output signal of said first shaping circuit to a pneumatic pulse signal of constant peak value, said second shaping circuit comprising a OR-NOR element controlled by the output signal of said first shaping circuit and a deflection type amplifying element controlled by two output signals of the OR-NOR element, and fluid operated integrating means for integrating the output signal of said second shaping circuit to obtain a mean pneumatic pressure, said integrating means comprising a volume chamber having a flow restriction connected thereto.

9. A fluidic digital-analogue converter comprising a first pneumatic pulse shaping circuit for shaping an input pneumatic pulse signal to a pneumatic pulse signal having a constant pulse width, a second pneumatic pulse shaping circuit for shaping the output signal of said first shaping circuit to a pneumatic pulse signal having a constant peak value as well as said constant width, said second shaping circuit comprising a logical flip-flop element serving as a switching valve having a predetermined peak value, said flip-flop element being controlled by the output signal of said first shaping circuit, and a fluid operated integrating circuit for integrating the output signal of said second shaping circuit to obtain a mean pneumatic pressure, said integrating circuit comprising a volume chamber having a flow restriction connected thereto.

* * * * *